United States Patent
Stougaard

(10) Patent No.: US 9,420,466 B2
(45) Date of Patent: Aug. 16, 2016

(54) METHOD AND APPARATUS FOR SECURE ELEMENT MANAGEMENT

(75) Inventor: Keld Stougaard, Karlslunde (DK)

(73) Assignee: Nokia Technologies Oy, Espoo (FI)

( * ) Notice: Subject to any disclaimer, the term of this patent is extended or adjusted under 35 U.S.C. 154(b) by 399 days.

(21) Appl. No.: 13/640,759

(22) PCT Filed: Apr. 16, 2010

(86) PCT No.: PCT/IB2010/000859
§ 371 (c)(1),
(2), (4) Date: Mar. 18, 2013

(87) PCT Pub. No.: WO2011/128715
PCT Pub. Date: Oct. 20, 2011

(65) Prior Publication Data
US 2013/0171963 A1    Jul. 4, 2013

(51) Int. Cl.
*H04W 12/08* (2009.01)
*H04W 4/00* (2009.01)
*G06F 21/62* (2013.01)
*H04W 48/18* (2009.01)
*H04W 76/02* (2009.01)

(52) U.S. Cl.
CPC ........... *H04W 12/08* (2013.01); *G06F 21/6209* (2013.01); *H04W 4/00* (2013.01); *H04W 4/001* (2013.01); *H04W 4/003* (2013.01); *G06F 2221/2147* (2013.01); *H04W 48/18* (2013.01); *H04W 76/02* (2013.01)

(58) Field of Classification Search
CPC ....... H04W 12/12; H04W 4/00; H04W 12/08; H04W 48/18; H04W 76/02; H04W 76/028; H04W 4/001; H04W 4/003; H04W 12/06; H04M 2250/60; G06F 21/6209; G06F 2221/2147; G06Q 20/32; G06Q 20/3229; H04L 63/083; H04L 63/0853; H04L 67/14
USPC ............................ 455/558, 435.1, 410–411
See application file for complete search history.

(56) References Cited

U.S. PATENT DOCUMENTS

2010/0136967 A1* 6/2010 Du ..................... H04W 8/205
455/432.3

OTHER PUBLICATIONS

ETSI TS 102 223 V5.11.0 (Jan. 2006); Technical Specification; Smart Cards; Card Application Toolkit (CAT (Release 5); section 6.4.7 (157 pages).
ETSI TS 102 221 V.5.10.0 (Jul. 2007); Technical Specification; Smart cards; UICC-Terminal interface; Physical and logical characteristics (Release 5); section 5.5.3 (125 pages).
Guthery, Scott B., et al., "Mobile Application Development with SMS and the SIM Toolkit", McGraw-Hill, 2010, 320 pgs.

* cited by examiner

Primary Examiner — Nizar Sivji
(74) Attorney, Agent, or Firm — Harrington & Smith

(57) ABSTRACT

In accordance with an example embodiment of the present invention, a method includes receiving at a terminal a refresh message sent by a secure element, wherein said refresh message includes a request for a session reset in response to at least one value associated with a current active application on said secure element is changed. The method further includes sending by said terminal a status message to said secure element, wherein said status message notifies said current active application on said secure element that an application session reset procedure will be executed. The method further includes sending by said terminal an application selection message to said secure element, wherein said application selection message instructs said secure element to reactivate said current active application with at least said new value.

12 Claims, 4 Drawing Sheets

METHOD AND APPARATUS FOR SECURE ELEMENT MANAGEMENT

TECHNICAL FIELD

Embodiments of the present invention relate generally to mechanisms that support wireless communications, and, more particularly, relate to a method and apparatus for managing at least one secure element in a wireless communications device.

BACKGROUND

Wireless communications devices typically comprise a terminal and a secure element, such as the Subscriber Identity Module (SIM) card, or the Universal Integrated Circuit Card (UICC). The interface between the UICC and the terminal is described in European Telecommnications Standards Institute (ETSI) Technical Specification (TS) 102.221 V5.10.0 "Smart cards: UICC-Terminal interface; Physical and logical characteristics (Release 5)".

SUMMARY

Various aspects of examples of the invention are set out in the claims.

According to a first aspect of the present invention, an apparatus comprising at least one processor and at least one memory including computer program code, the at least one memory and the computer program code configured to, with the at least one processor, cause the apparatus to perform at least the following: receive at a terminal a refresh message sent by a secure element, wherein said refresh message comprises a request for a session reset in response to at least one value associated with a current active application on said secure element is changed; send by said terminal a status message to said secure element, wherein said status message notifies said current active application on said secure element that an application session reset procedure will be executed; and send by said terminal an application selection message to said secure element, wherein said application selection message instructs said secure element to reactivate said current active application with at least said new value.

According to a second aspect of the present invention, a method comprising receiving at a terminal a refresh message sent by a secure element, wherein said refresh message comprises a request for a session reset in response to at least one value associated with a current active application on said secure element is changed; sending by said terminal a status message to said secure element, wherein said status message notifies said current active application on said secure element that an application session reset procedure will be executed; and sending by said terminal an application selection message to said secure element, wherein said application selection message instructs said secure element to reactivate said current active application with at least said new value.

According to a second aspect of the present invention, a method comprising receiving at a terminal a refresh message sent by a secure element, wherein said refresh message comprises a request for a session reset in response to at least one value associated with a current active application on said secure element is changed; sending by said terminal a status message to said secure element, wherein said status message notifies said current active application on said secure element that an application session reset procedure will be executed; and sending by said terminal an application selection message to said secure element, wherein said application selection message instructs said secure element to reactivate said current active application with at least said new value.

According to a third aspect of the present invention, an apparatus comprising at least one processor and at least one memory including computer program code the at least one memory and the computer program code configured to, with the at least one processor, cause the apparatus to perform at least the following: determine at a secure element that at least one value associated with a current active application on said secure element is changed; send by said secure element a refresh message to a terminal, wherein said refresh message comprises a request for a session reset in response to at least said one value associated with a current active application on said secure element is changed; receive a status message sent by said terminal, wherein said status message notifies to the said current active application on said secure element that an application session reset procedure will be executed; receive an application selection message sent by said terminal, wherein said application selection message instructs said secure element to reactivate said current active application with at least said new value; and reactivate at said secure element said current active application with at least said new value.

According to a fourth aspect of the present invention, a method comprising determining at a secure element that at least one value associated with a current active application on said secure element is changed; sending by said secure element a refresh message to a terminal, wherein said refresh message comprises a request for a session reset in response to at least said one value associated with a current active application on said secure element is changed; receiving a status message sent by said terminal, wherein said status message notifies to the said current active application on said secure element that an application session reset procedure will be executed; receiving an application selection message sent by said terminal, wherein said application selection message instructs said secure element to reactivate said current active application with at least said new value; and reactivating at said secure element said current active application with at least said new value.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 5 of the drawings.

Figure 1:
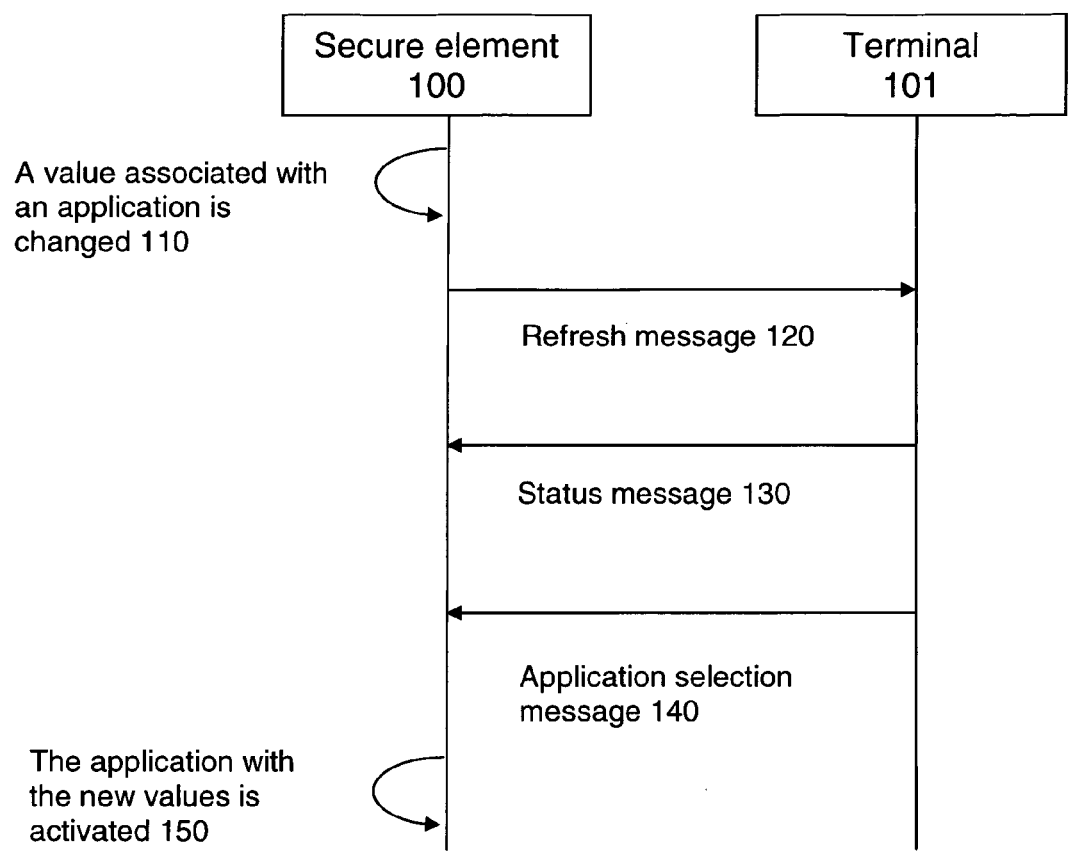
FIG. 1 illustrates a signaling diagram for managing secure element according to various example embodiments of the present invention.

FIG. 1 depicts a signaling diagram for managing secure element according to various example embodiments of the present invention. In this regard, FIG. 1 depicts signaling message exchange between a secure element 100 and a terminal 101. The secure element 100 may be a Subscriber Identity Module (SIM) card, a Universal Integrated Circuit Card (UICC), and/or the like. The terminal 101 may be any type of communication device that supports wireless communications, for example a Universal Mobile Telecommunications System (UMTS) mobile equipment, mobile station, fixed terminal, and/or the like. The secure element 100 is connected to the terminal 101 via an interface.

At 110, at least one value associated with the current active application on the secure element is changed. In an example embodiment, the current active application on the secure element is the Universal Subscriber Identity Module (USW). In an example embodiment, the value associated with the current active application on the secure element is the International Mobile Subscriber Identity (IMSI). The IMSI needs to be changed if the network operator doesn't have network coverage in a specific region or country that the user is roaming. The IMSI value may be change on the UICC internally or via over-the-air (OTA).

At 120, the secure element 100 may be configured to generate and transmit a refresh message. In an example embodiment, the refresh message is a refresh command of type 3G session reset.

At 130, the terminal 101 may be configured to generate and transmit a status message. In an example embodiment, the status message is a status command. In an example embodiment, the status command is of type session reset. In an example embodiment, the Indication of application status, P1 value in the status command is set as a value stating session reset. In an example embodiment, the status command model is of type Universal Subscriber Identity Module (USIM) application session reset.

At 140, the terminal 101 may be configured to generate and transmit an application selection message. In an example embodiment, the application selection message is a select command. In an example embodiment, the application identifier (AID) in the select command is set as the application identifier value of the current active application on the UICC. In an example embodiment, the application identifier value of the current active application is 7FFF.

At 150, the current active application with the new values remains activated on the secure element 100. The Personal Identification Number (PIN) is not reset on the secure element 100. The user does not have to reenter the PIN.

Figure 2:
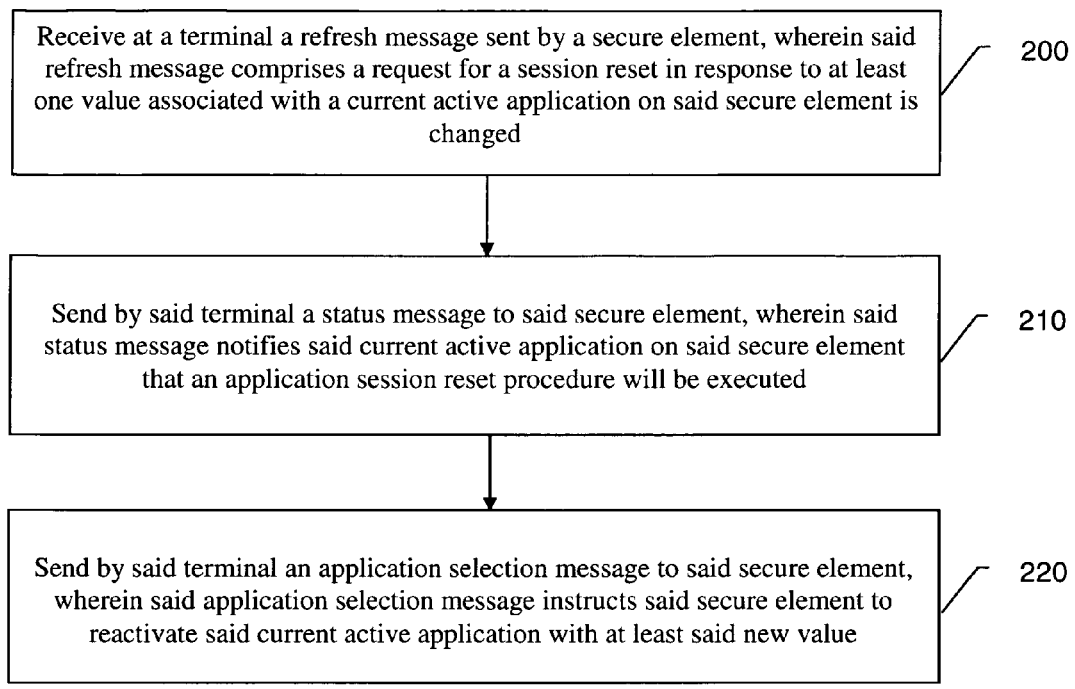
FIG. 2 illustrates an example method for managing secure element from the perspective of the terminal according to various example embodiments of the present invention.
Figure 3:
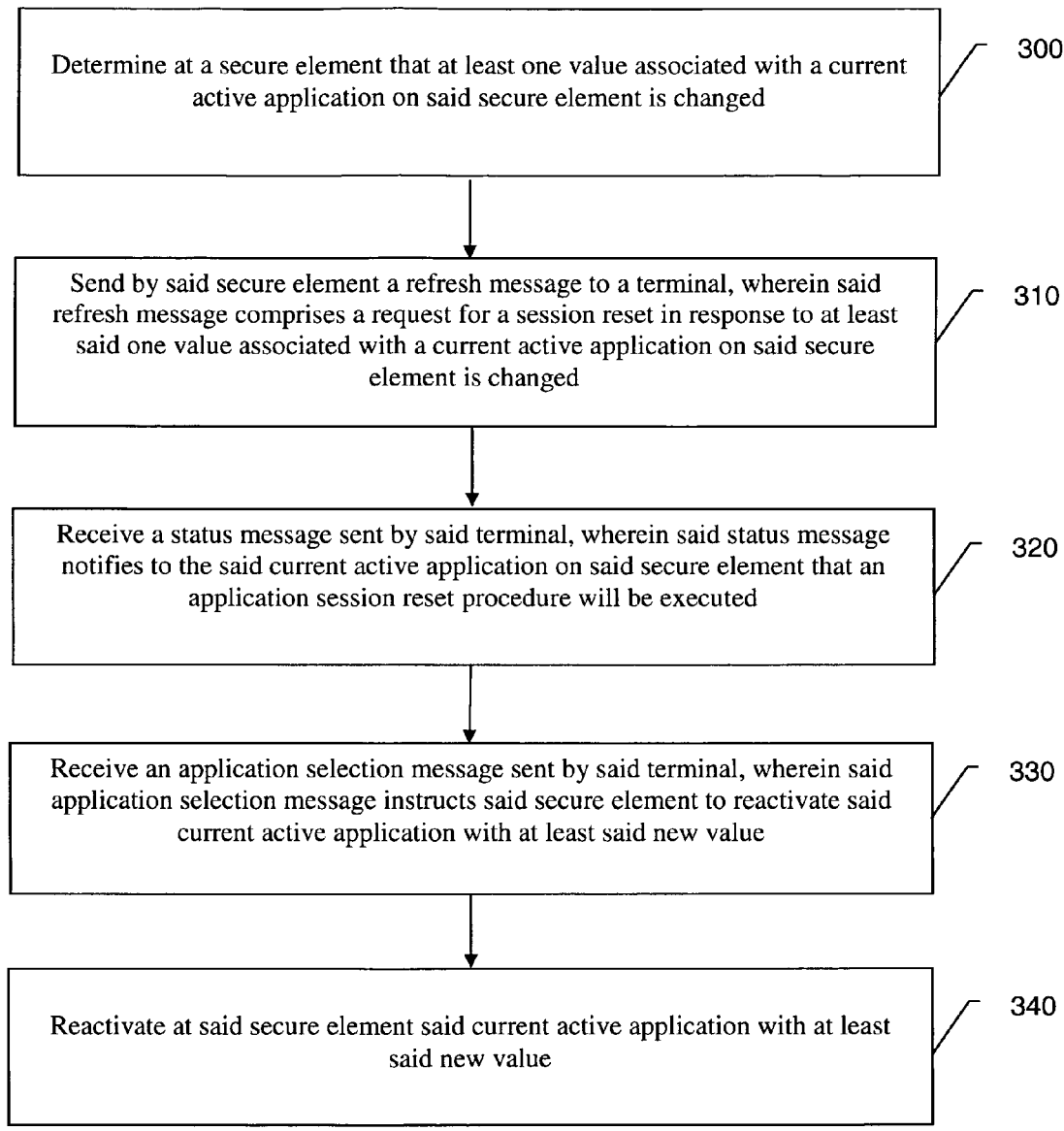
FIG. 3 illustrates an example method for managing secure element from the perspective of the secure element according to various example embodiments of the present invention.

FIGS. 2 and 3 illustrate flowcharts of example systems, methods, and/or computer program products according to example embodiments of secure element management. It will be understood that each block or operation of the flowcharts, and/or combinations of blocks or operations in the flowcharts, may be implemented by various means. Means for implementing the blocks or operations of the flowcharts, combinations of the blocks or operations in the flowchart, or other functionality of example embodiments of the present invention described herein may include hardware, and/or a computer program product including a computer-readable storage medium having one or more computer program code instructions, program instructions, executable computer-readable program code instructions stored therein, and/or the like.

FIG. 2 illustrates an example method for secure element management from the perspective of the terminal, such as the terminal 101 of FIG. 1. The example method includes receiving at a terminal a refresh message sent by a secure element at 200. The refresh message comprises a request for a session reset in response to at least one value associated with a current active application on said secure element is changed. In an example embodiment, the refresh message is a refresh command of 3G session reset.

The example method further includes sending by said terminal a status message to said secure element at 210. The status message notifies said current active application on said secure element that an application session reset procedure will be executed. In an example embodiment, the status message is a status command of Universal Subscriber Identity Module application session reset. In an example embodiment, the status command comprises an indication of application status P1. In an example embodiment, the indication of application status P1 is a value corresponding to Universal Subscriber Identity Module application session reset.

The example method further includes sending by said terminal an application selection message to said secure element at 220. The application selection message instructs said secure element to reactivate said current active application with at least said new value. In an example embodiment, the application selection message is a select command comprising an application identifier. In an example embodiment, the application identifier is set as the application identifier value of the current active application on the secure element. In an example embodiment, the current active application on the secure element is a Universal Subscriber Identity Module application. In an example embodiment, the application identifier value of the current active application on the secure element is 7FFF.

FIG. 3 illustrates an example method for secure element management from the perspective of the secure element, such as the secure element 100 of FIG. 1. The example method includes determining at a secure element that at least one value associated with a current active application on said secure element is changed at 300. In an example embodiment, the current active application on the secure element is the Universal Subscriber Identity Module application. In an example embodiment, the value associated with the current active application on the secure element is the International Mobile Subscriber Identity (IMSI).

The example method further includes sending by said secure element a refresh message to a terminal at 310. The refresh message comprises a request for a session reset in response to at least said one value associated with a current active application on said secure element is changed. In an example embodiment, the refresh message is a refresh command of 3G session reset.

The example method further includes receiving a status message sent by said terminal at 320. The status message notifies to the said current active application on said secure element that an application session reset procedure will be executed. In an example embodiment, the status message is a status command of Universal Subscriber Identity Module application session reset. In an example embodiment, the status command comprises an indication of application status P1. In an example embodiment, the indication of application status P1 is a value corresponding to Universal Subscriber Identity Module application session reset.

The example method further includes receiving an application selection message sent by said terminal at 330. The application selection message instructs said secure element to reactivate said current active application with at least said new value. In an example embodiment, the application selection message is a select command comprising an application identifier. In an example embodiment, the application identifier is set as the application identifier value of the current active application on the secure element. In an example embodiment, the current active application on the secure element is a Universal Subscriber Identity Module application. In an example embodiment, the application identifier value of the current active application on the secure element is 7FFF.

The example method further includes reactivating at said secure element said current active application with at least said new value. The current active application with the new values remains activated on the secure element. The Personal Identification Number (PIN) is not reset on the secure element 100. The user does not have to reenter the PIN.

Figure 4:
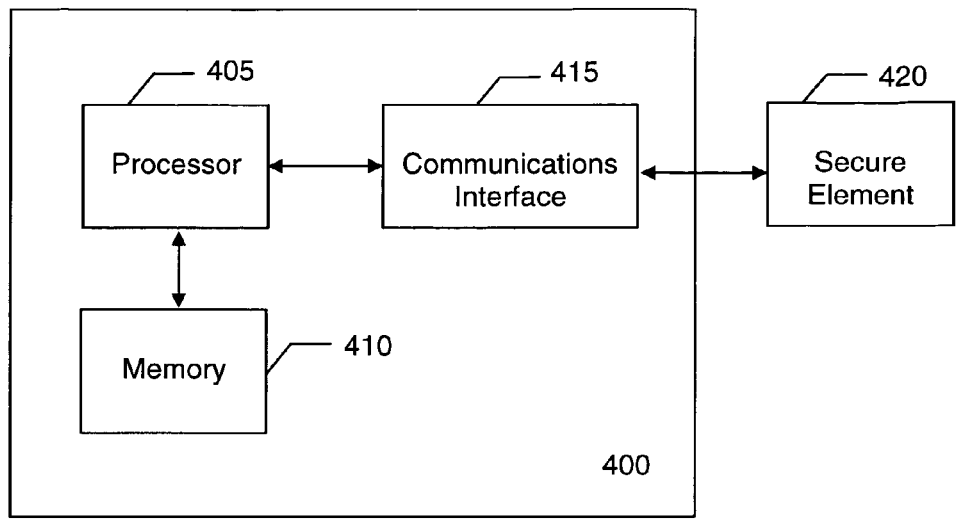
FIG. 4 illustrates a block diagram of an apparatus for managing secure element from the perspective of the terminal according to various example embodiments of the present invention.

FIG. 4 illustrates a block diagram of an apparatus 400 for managing secure element from the perspective of the terminal according to various example embodiments of the present invention. In an example embodiment, the apparatus 400 includes at least one processor 405, at least one memory 410, and at least one communication interface 415. Apparatus 400 may, be embodied as, or included as a component of, a communications device with wired or wireless communications capabilities. In an example embodiment, the apparatus 400 may be part of a communications device, such as a stationary or a mobile communications terminal. As a stationary communications terminal, the apparatus 400 may be part of, or embodied as, a server, a computer, an access point (e.g., base station), communications switching device, or the like. As a mobile device, the apparatus 400 may be a mobile and/or wireless communications node such as, for example, a mobile and/or wireless server, computer, access point, communications switching device, handheld device (e.g., telephone, portable digital assistant (PDA), mobile television, gaming device, camera, video recorder, audio/video player, radio, and/or a global positioning system (GPS) device), any combination of the aforementioned, or the like. Regardless of the type of communications device, apparatus 400 may also include computing capabilities.

The example apparatus 400 includes or is otherwise in communication with a processor 405, a memory 410, and a communications interface 415. The processor 405 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 405 may be representative of a plurality of processors, or one or more multiple core processors, operating in concert. Further, the processor 405 may be comprised of a plurality of transistors, logic gates, a clock (e.g., oscillator), other circuitry, and the like to facilitate performance of the functionality described herein. The processor 405 may, but need not, include one or more accompanying digital signal processors. In an example embodiment, the processor 405 is configured to execute instructions stored in the memory 410 or instructions otherwise accessible to the processor 405. The processor 405 may be configured to operate such that the processor causes the apparatus 400 to perform various functionalities described herein.

Whether configured as hardware or via instructions stored on a computer-readable storage medium, or by a combination thereof, the processor 405 may be an entity capable of performing operations according to embodiments of the present invention while configured accordingly. Thus, in example embodiments where the processor 405 is embodied as, or is part of, an ASIC, FPGA, or the like, the processor 405 is specifically configured hardware for conducting the operations described herein. Alternatively, in example embodiments where the processor 405 is embodied as an executor of instructions stored on a computer-readable storage medium, the instructions specifically configure the processor 405 to perform the algorithms and operations described herein. In an example embodiment, the processor 405 is a processor of a specific device (e.g., a communications server) configured for employing example embodiments of the present invention by further configuration of the processor 405 via executed instructions for performing the algorithms, methods, and operations described herein.

The memory 410 may be one or more computer-readable storage media that may include volatile and/or non-volatile memory. In an example embodiment, the memory 410 includes Random Access Memory (RAM) including dynamic and/or static RAM, on-chip or off-chip cache memory, and/or the like. Further, memory 410 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory 410 may include a cache area for temporary storage of data. In this regard, some or all of memory 410 may be included within the processor 405.

Further, the memory 410 may be configured to store information, data, applications, computer-readable program code instructions, and/or the like for enabling the processor 405 and the example apparatus 400 to carry out various functions in accordance with example embodiments of the present invention described herein. For example, the memory 410 could be configured to buffer input data for processing by the processor 405. Additionally, or alternatively, the memory 410 may be configured to store instructions for execution by the processor 405.

The communications interface 415 may be any device or means embodied in either hardware, a computer program product, or a combination of hardware and a computer program product that is configured to receive and/or transmit data from/to a secure element 420 and/or any other device or module in communication with the example apparatus 400. The communications interface may be configured to communicate information via any type of wired or wireless connection, and via any type of communications protocol, such as communications protocol that support communications between terminals and secure elements. Processor 405 may also be configured to facilitate communications via the communications interface 415 by, for example, controlling hardware included within the communications interface 415. In this regard, the communications interface 415 may include, for example, communications driver circuitry (e.g., circuitry that supports wired communications), one or more antennas, a transmitter, a receiver, a transceiver and/or supporting hardware, including, for example, a processor for enabling communications.

Figure 5:
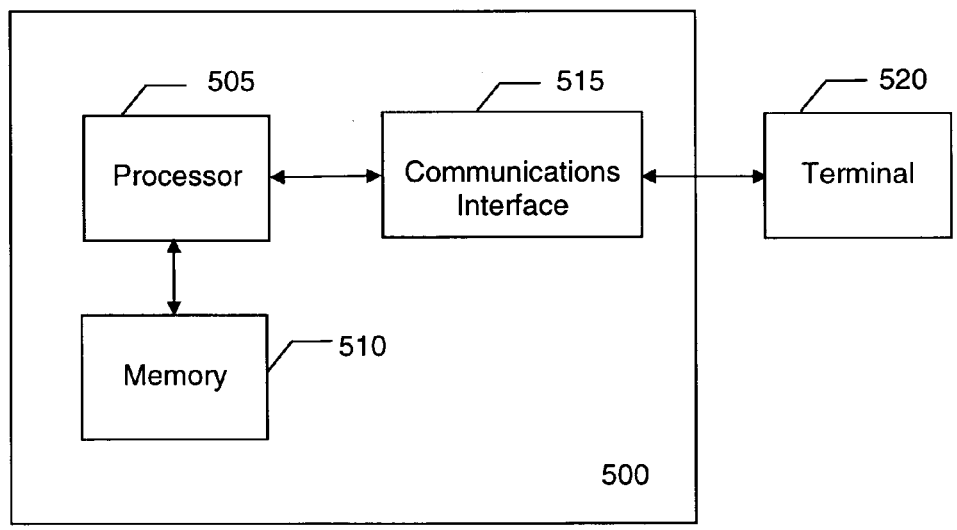
FIG. 5 illustrates a block diagram of an apparatus for managing secure element from the perspective of the secure element according to various example embodiments of the present invention.

FIG. 5 illustrates a block diagram of an apparatus 500 for managing secure element from the perspective of the secure element according to various example embodiments of the present invention. In an example embodiment, the apparatus 500 includes at least one processor 505, at least one memory 510, and at least one communication interface 515. Apparatus 500 may, be embodied as, or included as a component of, a secure element device with wired or wireless communications capabilities. In an example embodiment, the apparatus 500 may be part of a secure element device, such as a smart card. Regardless of the type of secure element device, apparatus 500 may also include computing capabilities.

The example apparatus 500 includes or is otherwise in communication with a processor 505, a memory 510, and a communications interface 515. The processor 505 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 505 may be representative of a plurality of processors, or one or more multiple core processors, operating in concert. Further, the processor 505 may be comprised of a plurality of transistors, logic gates, a clock (e.g., oscillator), other circuitry, and the like to facilitate performance of the functionality described herein. The processor 505 may include one or more accompanying digital signal processors. In an example embodiment, the processor 505 is configured to execute instructions stored in the memory 510 or instructions otherwise accessible to the processor 505. The processor 505 may be configured to operate such that the processor causes the apparatus 500 to perform various functionalities described herein.

Whether configured as hardware or via instructions stored on a computer-readable storage medium, or by a combination thereof, the processor 505 may be an entity capable of performing operations according to embodiments of the present invention while configured accordingly. Thus, in example embodiments where the processor 505 is embodied as, or is part of, an ASIC, FPGA, or the like, the processor 505 is specifically configured hardware for conducting the operations described herein. Alternatively, in example embodiments where the processor 505 is embodied as an executor of instructions stored on a computer-readable storage medium, the instructions specifically configure the processor 505 to perform the algorithms and operations described herein. In an example embodiment, the processor 505 is a processor of a specific device (e.g., a smart card) configured for employing example embodiments of the present invention by further configuration of the processor 505 via executed instructions for performing the algorithms, methods, and operations described herein.

The memory 510 may be one or more computer-readable storage media that may include volatile and/or non-volatile memory. In an example embodiment, the memory 510 includes Random Access Memory (RAM) including dynamic and/or static RAM, on-chip or off-chip cache memory, and/or the like. Further, memory 510 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory 510 may include a cache area for temporary storage of data. In this regard, some or all of memory 510 may be included within the processor 505.

Further, the memory 510 may be configured to store information, data, applications, computer-readable program code instructions, and/or the like for enabling the processor 505 and the example apparatus 500 to carry out various functions in accordance with example embodiments of the present invention described herein. For example, the memory 510 could be configured to buffer input data for processing by the processor 505. Additionally, or alternatively, the memory 510 may be configured to store instructions for execution by the processor 505.

The communications interface 515 may be any device or means embodied in either hardware, a computer program product, or a combination of hardware and a computer program product that is configured to receive and/or transmit data from/to a terminal 520 and/or any other device or module in communication with the example apparatus 500. The communications interface may be configured to communicate information via any type of wired or wireless connection, and via any type of communications protocol, such as communications protocol that support communications between terminals and secure elements. Processor 505 may also be configured to facilitate communications via the communications interface 515 by, for example, controlling hardware included within the communications interface 515. In this regard, the communications interface 515 may include, for example, communications driver circuitry (e.g., circuitry that supports wired communications), one or more antennas, a transmitter, a receiver, a transceiver and/or supporting hardware, including, for example, a processor for enabling communications.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
receiving at a terminal a refresh message sent by a secure element, wherein said refresh message comprises a request for a session reset in response to at least one value associated with a current active application on said secure element being changed, wherein said at least one value includes an International Mobile Subscriber Identity;
sending by said terminal a status message to said secure element, wherein said status message notifies said current active application on said secure element that an application session reset procedure will be executed, wherein the status message is a status command of Universal Subscriber Identity Module application session reset, wherein the status command comprises an indication of application status, and wherein the indication of application status is a value corresponding to Universal Subscriber Identity Module application session reset; and sending by said terminal an application selection message to said secure element, wherein said application selection message instructs said secure element to reactivate said current active application with at least one new value, said at least one new value including a new International Mobile Subscriber Identity, wherein the application selection message is a select command comprising an application identifier, and wherein the application identifier is set as the application identifier value of the current active application on the secure element, wherein said current active application on said secure element remains active without a need to re-enter a Personal Identification Number.

2. The method of claim 1, wherein the refresh message is a refresh command of 3G session reset.

3. The method of claim 1, wherein the current active application on the secure element is a Universal Subscriber Identity Module application.

4. The method of claim 1, wherein the application identifier value of the current active application on the secure element is 7FFF.

5. A method comprising:
determining at a secure element that at least one value associated with a current active application on said secure element is changed, wherein said at least one value includes an International Mobile Subscriber Identity;
sending by said secure element a refresh message to a terminal, wherein said refresh message comprises a request for a session reset in response to said at least one value associated with a current active application on said secure element being changed;
receiving a status message sent by said terminal, wherein said status message notifies said current active application on said secure element that an application session reset procedure will be executed, wherein the status message is a status command of Universal Subscriber Identity Module application session reset, wherein the status command comprises an indication of application status, and wherein the indication of application status is a value corresponding to Universal Subscriber Identity Module application session reset;
receiving an application selection message sent by said terminal, wherein said application selection message instructs said secure element to reactivate said current active application with at least one new value, said at least one new value including a new International Mobile Subscriber Identity, wherein the application selection message is a select command comprising an application identifier, and wherein the application identifier is set as the application identifier value of the current active application on the secure element; and
reactivating at said secure element said current active application with said at least one new value,
wherein said current active application on said secure element remains active without a need to re-enter a Personal Identification Number.

6. An apparatus comprising:
at least one processor; and
at least one memory including computer program code, the at least one memory and the computer program code configured, with the at least one processor, to cause the apparatus to perform at least the following:
receive at a terminal a refresh message sent by a secure element, wherein said refresh message comprises a request for a session reset in response to at least one value associated with a current active application on said secure element being changed, wherein said at least one value includes an International Mobile Subscriber Identity;
send by said terminal a status message to said secure element, wherein said status message notifies said current active application on said secure element that an application session reset procedure will be executed, wherein the status message is a status command of Universal Subscriber Identity Module application session reset, wherein the status command comprises an indication of application status, and wherein the indication of application status is a value corresponding to Universal Subscriber Identity Module application session reset; and
send by said terminal an application selection message to said secure element, wherein said application selection message instructs said secure element to reactivate said current active application with at least one new value, said at least one new value including a new International Mobile Subscriber Identity, wherein the application selection message is a select command comprising an application identifier, and wherein the application identifier is set as the application identifier value of the current active application on the secure element,
wherein said current active application on said secure element remains active without a need to re-enter a Personal Identification Number.

7. The apparatus of claim 6, wherein the refresh message is a refresh command of 3G session reset.

8. The apparatus of claim 6, wherein the current active application on the secure element is a Universal Subscriber Identity Module application.

9. The apparatus of claim 6, wherein the application identifier value of the current active application on the secure element is 7FFF.

10. An apparatus comprising:
at least one processor; and
at least one memory including computer program code, the at least one memory and the computer program code configured, with the at least one processor, to cause the apparatus to perform at least the following:
determine at a secure element that at least one value associated with a current active application on said secure element is changed, wherein said at least one value includes an International Mobile Subscriber Identity;
send by said secure element a refresh message to a terminal, wherein said refresh message comprises a request for a session reset in response to said at least one value associated with a current active application on said secure element being changed;
receive a status message sent by said terminal, wherein said status message notifies said current active application on said secure element that an application session reset procedure will be executed, wherein the status message is a status command of Universal Subscriber Identity Module application session reset, wherein the status command comprises an indication of application status, and wherein the indication of application status is a value corresponding to Universal Subscriber Identity Module application session reset;
receive an application selection message sent by said terminal, wherein said application selection message instructs said secure element to reactivate said current active application with at least one new value, said at least one new value including a new International Mobile Subscriber Identity, wherein the application selection message is a select command comprising an application identifier, and wherein the application identifier is set as the application identifier value of the current active application on the secure element; and reactivate at said secure element said current active application with said at least one new value, wherein said current active application on said secure element remains active without a need to re-enter a Personal Identification Number.

11. A computer program product comprising a non-transitory computer-readable storage medium bearing computer program code embodied therein for use with a computer, the computer program code comprising:

code for receiving at a terminal a refresh message sent by a secure element, wherein said refresh message comprises a request for a session reset in response to at least one value associated with a current active application on said secure element being changed, wherein said at least one value includes an International Mobile Subscriber Identity;

code for sending by said terminal a status message to said secure element, wherein said status message notifies said current active application on said secure element that an application session reset procedure will be executed, wherein the status message is a status command of Universal Subscriber Identity Module application session reset, wherein the status command comprises an indication of application status, and wherein the indication of application status is a value corresponding to Universal Subscriber Identity Module application session reset; and code for sending by said terminal an application selection message to said secure element, wherein said application selection message instructs said secure element to reactivate said current active application with at least one new value, said at least one new value including a new International Mobile Subscriber Identity, wherein the application selection message is a select command comprising an application identifier, and wherein the application identifier is set as the application identifier value of the current active application on the secure element, wherein said current active application on said secure element remains active without a need to re-enter a Personal Identification Number.

12. A computer program product comprising a non-transitory computer-readable storage medium bearing computer program code embodied therein for use with a computer, the computer program code comprising:

code for determining at a secure element that at least one value associated with a current active application on said secure element is changed, wherein said at least one value includes an International Mobile Subscriber Identity;

code for sending by said secure element a refresh message to a terminal, wherein said refresh message comprises a request for a session reset in response to said at least one value associated with a current active application on said secure element being changed;

code for receiving a status message sent by said terminal, wherein said status message notifies said current active application on said secure element that an application session reset procedure will be executed, wherein the status message is a status command of Universal Subscriber Identity Module application session reset, wherein the status command comprises an indication of application status, and wherein the indication of application status is a value corresponding to Universal Subscriber Identity Module application session reset;

code for receiving an application selection message sent by said terminal, wherein said application selection message instructs said secure element to reactivate said current active application with at least one new value, said at least one new value including a new International Mobile Subscriber Identity, wherein the application selection message is a select command comprising an application identifier, and wherein the application identifier is set as the application identifier value of the current active application on the secure element; and code for reactivating at said secure element said current active application with said at least one new value, wherein said current active application on said secure element remains active without a need to re-enter a Personal Identification Number.

* * * * *